S. P. SHACKLETON.
ELECTRON TUBE TESTING CIRCUITS.
APPLICATION FILED MAR. 18, 1919.
1,365,734.
Patented Jan. 18, 1921.
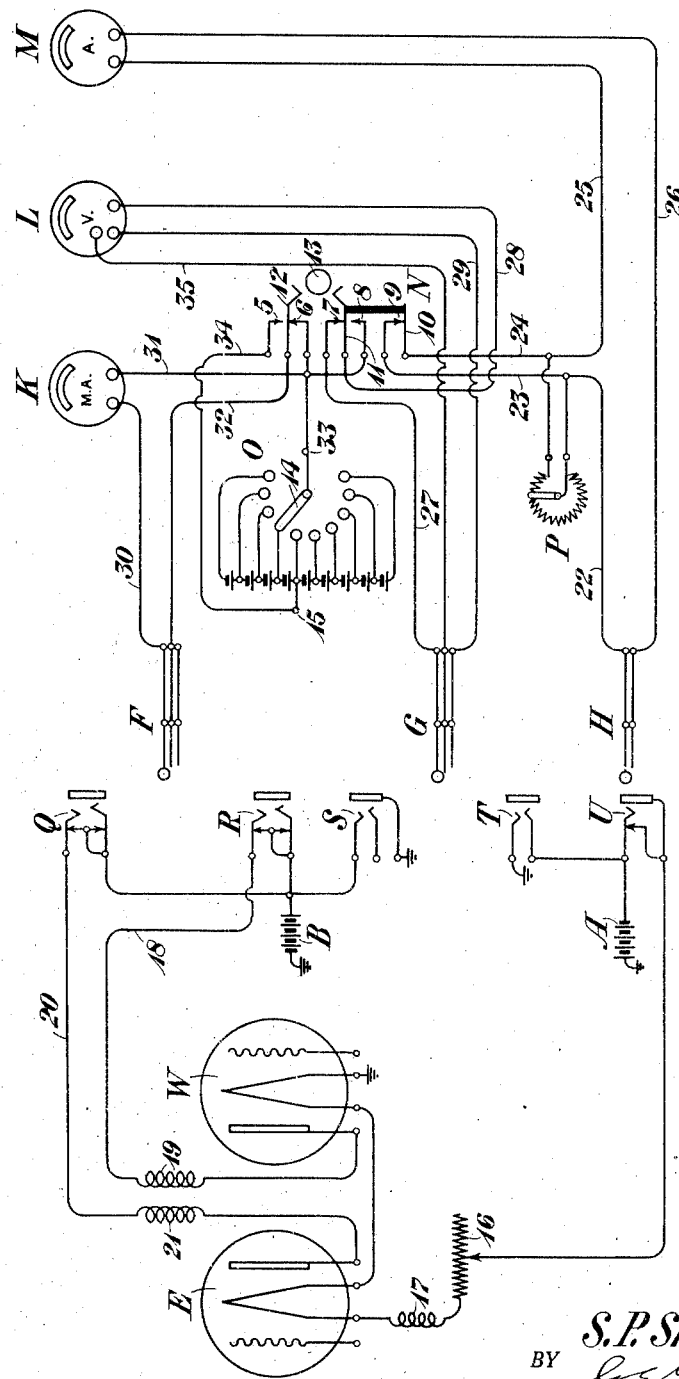
INVENTOR.
S. P. Shackleton
BY
ATTORNEY

UNITED STATES PATENT OFFICE.

SAMUEL P. SHACKLETON, OF NEW YORK, N. Y., ASSIGNOR TO AMERICAN TELEPHONE AND TELEGRAPH COMPANY, A CORPORATION OF NEW YORK.

ELECTRON-TUBE-TESTING CIRCUITS.

1,365,734.   Specification of Letters Patent.   Patented Jan. 18, 1921.

Application filed March 18, 1919. Serial No. 283,345.

*To all whom it may concern:*

Be it known that I, SAMUEL P. SHACKLETON, residing at New York, in the county of Bronx and State of New York, have invented certain Improvements in Electron-Tube-Testing Circuits, of which the following is a specification.

This invention relates to electron tube testing circuits, particularly to circuits for determining current and voltage relations in telephone repeater tubes.

Electron tubes which are used as repeaters for telephone currents must frequently be subjected to two distinct tests. The first of these is made to ascertain whether the tube is operating within certain prescribed limits of current and voltage which have been predetermined as giving the most satisfactory operation of the tubes with regard to amplification, current drain and life of the tube. This test is made by inserting appropriate meters in the filament and plate circuits. The second of these tests is made to determine whether the condition of the tubes is such as to warrant their replacement. For this test the voltage on the plate is adjusted to a predetermined value and the filament current is lowered to such an extent that the consequent reduction in the electron discharge causes a reduction in the plate current and consequently affects the amplification value of the tube. The value of the plate current under these conditions is noted and, if below a predetermined minimum, the tube is discarded and another one substituted. Since the second test is made under conditions of reduced amplification the tube is inoperative to perform its normal repeater functions at the accustomed gain.

It is desirable that these tests be conducted with the least possible interference in the operation of the repeaters, and by means of this invention an arrangement of circuits is provided whereby both tests may be made expeditiously and accurately with minimum disturbance of the normal operation of the tubes.

This invention will be more fully understood from the following description considered in connection with the accompanying illustrative drawing which shows one embodiment thereof.

In the drawing reference characters E and W designate two electron tubes which are interconnected through a two-way two repeater circuit not shown on the drawing. This circuit may, if desired, be of the type illustrated in the co-pending application of Arthur F. Rose, Serial No. 219,585, filed February 28, 1918 for battery supply circuits for repeaters. Reference character K designates a milli-ammeter provided for indicating the plate current in either tube E or W. L is a voltmeter for determining the voltages of batteries A and B and M is an ammeter for determining the current in the filaments of both tubes.

O is a source of variable potential which may comprise a number of dry cells connected in series, the terminals of each cell being connected to contact points which are in coöperative relation with a pivoted contact arm 14. Terminals 33 and 15 of source O are connected, respectively, to arm 14 and to a terminal of one of the intermediate dry cells, so that a positive or a negative electromotive force of variable magnitude may be connected between these terminals by varying the position of arm 14. Where desired, other sources of variable potential may be used.

N is a switch comprising blades 10, 11 and 12 which in the position shown (herein termed for convenience the normal position) close against contact points 9, 7 and 6 respectively. When the switch is reversed by operation of the handle indicated at 13, contact with points 9, 7 and 6 is broken and blade 11 makes contact with point 8 and blade 12 closes against contact 5.

P is a rheostat of variable resistance which is at times included in the filament circuit as described hereinafter. Q and R are jacks coöperating with a plug F, S and T are jacks coöperating with plug G and U is a jack coöperating with plug H as described below.

The apparatus described above is controlled by the following circuits:

The filaments of tubes E and W are connected in series in a circuit extending from battery A, through jack U, resistance 16, impedance 17, filament of tube E, filament of tube W, through ground back to battery A. The space currents for tubes E and W are supplied from battery B, the circuit for the plate of tube W comprising jack R, wire 18 and impedance 19, and the circuit for the plate of tube E comprisng jack Q, wire 20 and impedance 21. Except for the jacks Q, R and U, the above circuits are the same as those shown in the above-mentioned copending application, and reference may be had thereto for a further description thereof.

The circuit for ammeter M is from the tip of plug H, through wires 22 and 23, contact 9—10 of switch N (normal), wires 24 and 25, ammeter M and wire 26 to the ring of plug H. When switch N is reversed it opens contact 9—10 so that the ammeter circuit is then through resistance P, connected across wires 23 and 24. When plug H is inserted into jack U it opens the normally closed contact between the tip and ring of the jack so that the filament current flows through ammeter M. Resistance P, being normally short circuited, causes a reduction in the filament current only when switch N is reversed.

The circuit for the milliammeter K extends from the ring of plug F, through wire 32, contact 12—6 of switch N (normal), wire 31, milliammeter K and wire 30, to the tip of plug F. When plug F is inserted into jack Q or R, it breaks the normally closed connection between the tip and ring of the jack so that the existing space current is caused to flow through milliammeter K and its value is indicated thereby, provided switch N is normal.

When, however, switch N is reversed contact 12—6 is opened and contact 12—5 is closed, the circuit now being: from the ring of plug F, through wire 32, contact 12—5, wire 34, source O, wire 31, milliammeter K and wire 30 to the tip of plug F. If now plug F is inserted into jack Q or R the source of potential O is connected in series with battery B, so that the plate current is increased or decreased according to the position of contact finger 14.

Voltmeter L is provided with two scales, a high scale for determining the voltage of battery B and a low scale for ascertaining the voltage of battery A. The circuit for the high scale is: from the tip of plug G, through wire 27, contact 7—11 of switch N, wire 28, voltmeter L and wire 29 to the sleeve of plug G. The tip of jack S is connected to the terminal of battery B and the sleeve of this jack is connected to ground. When, therefore, plug G is inserted into jack S and switch N is normal, voltmeter L is connected across battery B and indicates the potential thereof. In case, however, switch N is reversed the connection of the voltmeter to the tip of plug G is opened at contact 7—11 of switch N, the circuit for the voltmeter now being: from terminal 33 of source O, through contact 8—11 of switch N, wire 28, voltmeter L and wire 29 to the sleeve of plug G. Since source O is connected in series with battery B when plug F is inserted in either jack Q or R, voltmeter L now indicates the combined voltage of battery B and source O.

The circuit for the low scale of the voltmeter is: from the tip of plug G through wire 27, contact 7—11 of switch N, wire 28, voltmeter L and wire 35 to the ring of plug G. The tip of jack T is connected to ground and the ring to battery A so that when plug G is inserted in jack T the low scale of the voltmeter is connected across battery A. It is understood that the functions performed by plug G and jacks S and T may be performed by other switches, such as a key permanently connected to batteries A and B, without departing from the spirit of this invention.

In order to determine the currents and voltages under which a tube normally operates, switch N is placed into its normal position, plug H is inserted into jack U, plug G into jack S for a measurement of the voltage of battery B, and into jack T for a determination of the voltage of battery A, and plug F is inserted, say, into jack Q for a test on tube E. With these connections ammeter M indicates, as stated above, the current in the filaments of tubes E and W and if this current is not within the prescribed limits it is adjusted by means of rheostat 16. Voltmeter L indicates the voltage impressed by battery B on the plate circuits or by battery A on the filament circuit and milliammeter K shows the current flowing in the plate circuit of tube E.

Since the filament of tube W is connected in series with the filament of tube E and since the plates of the two tubes are connected in parallel to battery B, ammeter M and voltmeter L indicate also the filament current and plate voltage respectively for tube W and the only measurement that remains to be made to complete this test of tube W is a determination of the plate current, which is done by removing plug F from jack Q and inserting it into jack R, so that milliammeter K now shows the plate current in the tube W.

To determine whether the condition of a tube is such as to warrant its continued use, plugs F, G and H are inserted as before into jacks Q, S and U, and switch N is reversed so that resistance P is automatically inserted into the filament circuit and source O is connected into the plate circuit of tube E. Resistance P is then adjusted until ammeter M indicates the current with which it is desired to make the test and source O is regulated until the desired voltage is impressed on the plate circuit, as indicated by voltmeter L. The milliammeter K is then read and if the plate current indicated thereby is not below a predetermined minimum, switch N is at once returned to its normal position so that resistance P and source O are removed from the electron tube circuits and normal conditions again obtain therein. If the tube fails to give the desired plate current it is discarded and a new tube substituted therefor.

The same test is then made on the tube W by inserting the plug F into jack R, with switch N reversed, so that source O is now connected in the plate circuit of tube W.

If this test is made directly after the test on tube E, the voltage of source O need not be further regulated, since in the previous test it has already been adjusted to correct the voltage of battery B. All that need be done is to note the indication of milliammeter K and if this is below the predetermined minimum the tube is disconnected, and a new one is connected in place thereof. Switch N is then returned to its normal position and the plugs are withdrawn from their jacks.

In the practice of this invention the testing panel is preferably equipped with the above described testing apparatus and all the repeaters in the station are brought out in testing jacks on this panel, so that it is an easy matter for an attendant to make the above tests on all repeater tubes in a very short time. One of the main advantages of this invention is apparent when it is considered that the "A" battery is generally common to all the repeaters of a station and the filament circuits have normally the same current so that after the correct value of resistance P has been determined in the first test it need not be readjusted for the following tests. In case a variation occurs in the filament current for different tubes this can be adjusted by regulating rheostat 16 without interfering with the normal repeater operation. Similarly the "B" battery voltage is the same for all repeaters and consequently, the source O need not be regulated after the first test. Furthermore the testing apparatus is so arranged that it interferes with the operation of the repeater only during the time when switch N is reversed i. e. while sources O and resistance P are connected in the tube circuits. This interval of time may be made extremely small after the first adjustment of source O and resistance P and switch N need be held reversed only long enough to permit a reading of the meters. Thus the invention reduces the time during which the repeaters are inoperative to an extremely short interval.

Although only one form of the invention is shown and described herein, it is understood that various changes and modifications may be made therein within the scope of the appended claims without departing from the spirit and scope of the invention.

What is claimed is:

1. In combination, an electron tube, a plate circuit and a filament circuit associated therewith, means for adjusting the current in the filament circuit, means for adjusting the voltage in the plate circuit, and a device for simultaneously connecting said adjusting means into said circuits.

2. In combination, an electron tube, a filament circuit associated therewith and comprising a current measuring device, a plate circuit associated with said tube and comprising voltage and current measuring devices, a variable resistance, a source of variable electromotive force, and a switch for simultaneously connecting said variable resistance into said filament circuit and said source of variable electromotive force into said plate circuit.

3. In combination, an electron tube, a filament circuit, a plate circuit, means for at times reducing the flow of current in said filament circuit below normal, means for at times correcting the voltage in said plate circuit and a device for introducing simultaneously said reducing means into said filament circuit and said correcting means into said plate circuit.

4. In combination, a plate circuit, a source of current therefor, means for modifying the voltage of said source, a voltage measuring device connected across said source, and a switching device for connecting said voltage modifying means to said source, and connecting said voltage measuring device across said modified source.

5. In combination, a plate circuit, a source of current therefor, an auxiliary source of current for modifying said first mentioned source, a voltmeter connected across said first source, and a switch for simultaneously connecting said auxiliary source in series with said first mentioned source and said voltmeter across said two sources.

6. In combination, a plate circuit, a first source of current connected in said circuit, a second source of current, a contact for at times connecting said second source in series with said first source, a voltmeter, means for connecting said voltmeter to each side of said first source and to one side of said second source, a contact for opening the voltmeter connection to one side of the first source and closing the connection to the second source, and means for causing concordant operation of said contacts.

7. In combination, a plurality of electron tubes having filaments and plates, a series circuit comprising said filaments, a source of plate current, circuits for connecting said plates in parallel relationship to said source of plate current, a variable resistance for reducing the filament current below normal, a source of variable electromotive force for correcting the voltage on said plates, a current measuring device, means for introducing said device into said filament circuit, current and voltage measuring devices, means for introducing the last mentioned devices into one of said plate circuits, and means for inserting simultaneously said resistance and said source of variable electromotive force into said filament and plate circuits respectively.

In testimony whereof, I have signed my name to this specification this seventeenth day of March 1919.

SAMUEL P. SHACKLETON.